United States Patent [19]

Wittrock et al.

[11] Patent Number: 4,760,448
[45] Date of Patent: Jul. 26, 1988

[54] METHOD OF MEASURING AMPLITUDE VARIATIONS OF A VIDEO CARRIER AND APPARATUS THEREFOR

[75] Inventors: Glen Wittrock; Barry A. Arneson, both of Sioux Falls, S. Dak.

[73] Assignee: Sencore, Inc., Sioux Falls, S. Dak.

[21] Appl. No.: 25,567

[22] Filed: May 4, 1987

[51] Int. Cl.$^4$ .................... H04N 17/00; H04N 5/08
[52] U.S. Cl. ........................... 358/139; 358/156
[58] Field of Search .............. 358/139, 138, 153, 10, 358/155, 107, 156

[56] References Cited

U.S. PATENT DOCUMENTS 3,743,774  7/1973  Chipman et al. ............. 358/156 X
3,995,105  11/1976  Krivosheev et al. ............. 358/139
4,303,939  12/1981  Stephens et al. ............. 358/139
4,417,268  11/1983  LaSota ............................. 358/139 X Primary Examiner—Howard W. Britton
Assistant Examiner—Victor R. Kostak
Attorney, Agent, or Firm—Edmond T. Patnaude

[57] ABSTRACT

A composite RF television signal is converted to an IF signal, passed through an AGC circuit and the amplitudes of the horizontal sync pulses are sampled only during the horizontal sync period. The high and low peak samples are stored and the difference between the levels of these peak samples, which is proportional to the HUM in the system, drives a meter calibrated to show the percent of HUM in the composite RF television signals.

4 Claims, 2 Drawing Sheets

HUM CIRCUIT TIMING EXAMPLE

METHOD OF MEASURING AMPLITUDE VARIATIONS OF A VIDEO CARRIER AND APPARATUS THEREFOR

The present invention relates in general to a method and instrument for measuring amplitude variations of a video carrier, and in particular to a method and instrument for making such measurements in the absence of a video carrier reference signal.

BACKGROUND OF THE INVENTION

A measurement or test of the type contemplated by the present invention is referred to as a HUM test and is commonly used in testing cable television systems. Indeed, FCC Rules and Regulations 76.605 (7) state that "The peak-to-peak variation in visual signal level caused by undesired low frequency disturbances (hum or repetitive transients) generated within the system, or by inadequate low frequency response, shall not exceed 5 percent of the visual signal level."

The methods and instruments heretofore known for making the HUM test have been unusable for some applications and are restricted for use with special signals for cable systems because they measure amplitude changes of the continuous wave (CW) reference signal which is usually transmitted on the cable along with the standard television signals. There are, however, some cable distribution systems which do not transmit the CW reference signal, wherefore the prior art methods and instruments cannot be used to perform the HUM test on these systems.

SUMMARY OF THE INVENTION

Briefly, there is provided in accordance with the present invention a new and improved method and instrument for measuring low frequency amplitude variations of a video modulated carrier. In this system a composite television signal is converted to an IF signal, passed through an AGC circuit, and thereafter, the high and low peak amplitudes of the horizontal sync pulses in the composite signal are sampled only during the horizontal sync period and held. The sampled levels of the horizontal sync pulses are then applied to a microprocessor. Each successive sample is compared to the previous maximum and minimum samples, and the updated minimum and maximum levels are then stored in the microprocessor. The difference between these two stored levels is proportional to the HUM in the system. The microprocessor uses this difference to drive a digital-to-analog driver circuit which drives a meter calibrated to show the percent of HUM in the RF input signal.

GENERAL DESCRIPTION OF THE DRAWINGS

Further objects and advantages and a better understanding of the present invention will be had by reference to the following detailed description taken in connection with the accompanying drawings wherein:

FIG. 1 is a block circuit diagram of an instrument embodying the present invention; and FIG. 2 is a timing diagram showing the time relationships between a plurality of waveforms occurring at different respective points in the circuit shown in FIG. 1.

DETAILED DESCRIPTION OF A PREFERRED EMBODIMENT

Figure 1:
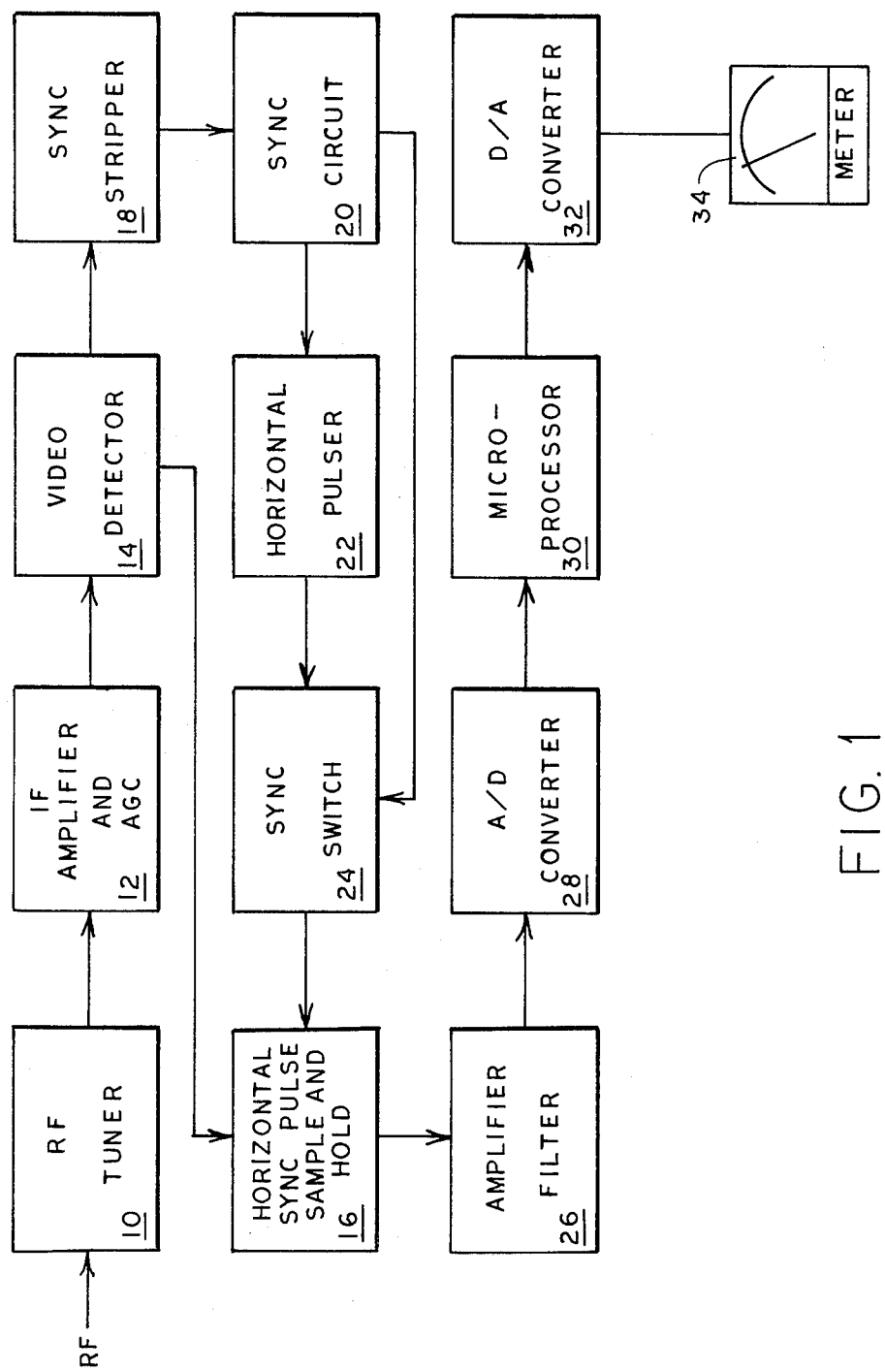

Refer to FIG. 1 where there is shown in block diagram form a circuit for measuring HUM in a television signal. As there shown, the RF composite television signals for a plurality of channels are applied to a conventional RF tuner 10 which converts the carrier frequency of a selected composite television signal to the IF frequency band of an IF amplifier and AGC circuit 12 to which the IF signal is applied. The output of the IF amplifier and AGC circuit 12 is applied to a conventional video detector 14 from which the detected video output signal is applied to a horizontal sync pulse sample and hold circuit 16. This signal from the video detector includes the sync pulses as well as the video signal itself.

The output of the video detector 14 is also applied to a sync stripper circuit 18 which separates the horizontal and vertical sync pulses from the detected composite video signal and applies them to a sync circuit 20 which triggers a horizontal pulser circuit 22 which generates a train of horizontal pulses corresponding to the horizontal pulses of the composite television signal.

Figure 2:
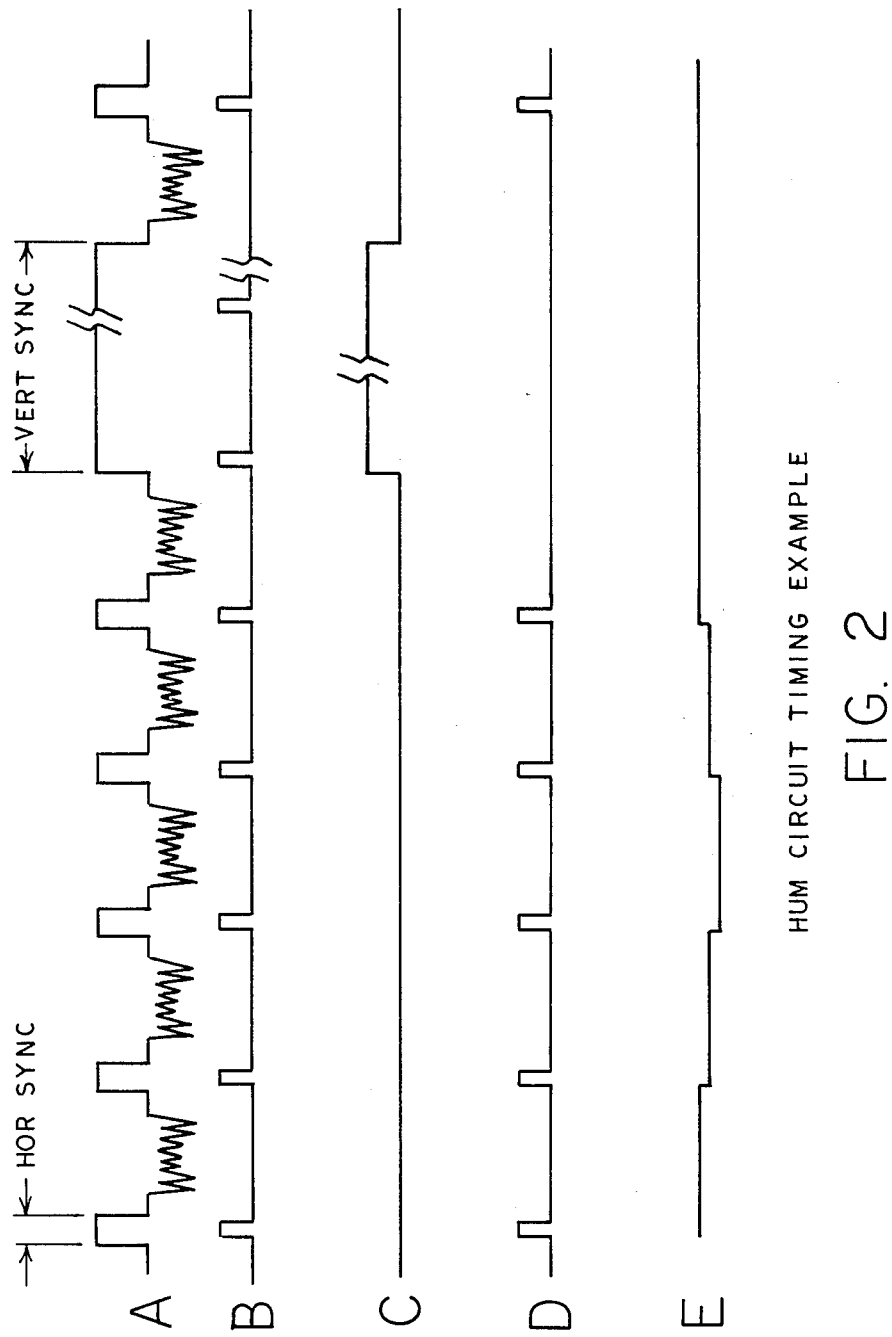

With reference to FIG. 2, the waveform shown at A is representative of the detected composite television signal which is applied to the horizontal sync pulse sample and hold circuit 16 by the video detector 14. Waveform B is representative of the output of the horizontal pulser 22 and may be seen to constitute a plurality of pulses corresponding to the horizontal sync pulses of the composite television signal. As may be seen in FIG. 2, the pulses in waveform B are delayed slightly from the leading edge of the horizontal sync pulses in the composite television signal.

The sync circuit 20 also provides output pulse in sync with the vertical sync pulses in the composite television signal and these pulses are applied to the sync switch 24 to disable a sync switch 24 during the vertical sync period. The sync switch 24 is connected between the output of the horizontal pulser 22 and a control input of the horizontal sync pulse sample and hold circuit 16 which enables the circuit 16 to sample the signal applied thereto from the video detector 14 only during the occurrence of the pulses transmitted to the circuit 16 by the sync switch 24.

With reference to FIG. 2, waveform C is illustrative of the output signal from the sync circuit 20 which is applied to the sync switch 24, and waveform D illustrates the output waveform from the sync switch 24. It may be seen that the pulses from the sync switch 24 enable the circuit 16 to sample the composite television signal only during occurrence of the horizontal sync pulses which are provided during the video portion of the composite television signal and not during the vertical sync pulse period. As is explained more fully hereinafter, the reason for this is that during the vertical sync pulse period additional control signals are transmitted and the levels of these signals would otherwise be measured and confuse the measurements being taken.

Waveform E shows the output signal from the horizontal sync pulse sample and hold circuit 16 for a typical signal. As there shown the output signal which is applied to the filter 26 does include a certain amount of HUM which is represented by level of the waveform E. The output signal from the filter 26 which is in analog form is applied to an analog to digital converter 28 which provides a digital output representative of the waveform applied thereto from the amplifier filter 26. This digital signal is then applied to a microprocessor 30 which stores the maximum and minimum peak values of the signals applied thereto and uses this difference to drive a digital to analog converter 32 which in turn drives a meter 34 which is calibrated to directly read the percent of HUM in the composite television signal which is tuned in by the tuner 10. The microprocessor 30 is preferable set to recycle about every 1/30 of a second which is sufficiently fast so that the meter 34 does not noticeably follow changes which occur during each measuring cycle.

This instrument may be used to measure the HUM on the continuous wave reference signals which are sometimes included in the cable signal which is transmitted by most cable systems. The continuous wave reference signal is at a video carrier frequency but is not modulated. With the circuit of the present invention the horizontal pulser 22 generates pulses at the horizontal line frequency and thus samples the continuous wave signal during the occurrence of these pulses, wherefore, the circuit measure any HUM which may be present on this reference signal.

It may thus be seen that the present invention combines a new and improved method and apparatus for measuring low frequency signals modulated on the video carrier of a composite television signal. Moreover, the same method and circuit can be used to measure the level of any low frequency signal which may be modulated on a video carrier which is not modulated with either a video signal or with a horizontal and vertical signal. An important advantage of the present invention is that the technician may use the tuner 10 to select any one of the television channels on which he desires to make a measurement. Using the prior art methods wherein the reference signal was used to make the HUM test, it was not possible to perform this test for each of the channels being used on the particular cable system. Of course, this method can also be used for measuring the HUM in a video signal received directly from the broadcast transmitter.

While the present invention has been described in connection with those particular embodiments thereof, it will be understood by those in the art that many changes may be made without departing from the true spirit and scope of the present invention. Therefore, it is intended by the appended claims to cover all such changes and modifications which come within the true spirit and scope of this invention.

What is claimed is:

1. A method of measuring periodic amplitude variations of a video carrier modulated with a video signal including video information and horizontal and vertical sync pulses, comprising the steps of
   detecting said video signal,
   sampling the level of said detected video signal only during the occurrence of said horizontal sync pulses,
   storing the maximum and minimum levels of the sampled levels occurring during a predetermined period, and
   displaying a visual indication of the difference between said maximum and minimum levels.

2. A method according to claim 1 comprising the additional step of
   passing said modulated video carrier through an automatic gain control circuit before detecting said video signal.

3. A method of measuring periodic amplitude variations of a video carrier modulated with a video signal including video information and horizontal and vertical sync pulses, comprising the steps of
   detecting said video signal,
   separating said horizontal and vertical sync signals from the detected video signal,
   generating a train of sampling pulses in synchronization with and at the frequency of said horizontal sync pulses,
   coupling said train of sampling pulses to a sample and hold circuit to which said detected video signal is applied,
   interrupting said train of sampling pulses during the vertical sync period thereby to prevent sampling of said detected video signal during the vertical sync period,
   storing the maximum and minimum levels of said sampling pulses during a predetermined period, and
   displaying a visual indication of the difference between said maximum and minimum levels.

4. A method of measuring periodic amplitude variations of a video carrier modulated with a video signal including video information and horizontal and vertical sync pulses, comprising the steps of
   passing said modulated video carrier through an automatic gain control circuit,
   detecting said video signal,
   separating said horizontal and vertical sync signals from the detected video signal,
   generating a train of sampling pulses in synchronization with and at the frequency of said horizontal sync pulses,
   coupling said train of sampling pulses to a sample and hold circuit to which said detected video signal is applied,
   interrupting said train of sampling pulses during the vertical sync period thereby to prevent sampling of said detected video signal during the vertical sync period,
   storing the maximum and minimum levels of the sampled pulses occurring during a predetermined period, and
   displaying a visual indication of the difference between said maximum and minimum levels.

* * * * *